W. H. LIVINGSTON.
CLEVIS.
APPLICATION FILED NOV. 30, 1907.
912,143.
Patented Feb. 9, 1909.
2 SHEETS—SHEET 1.
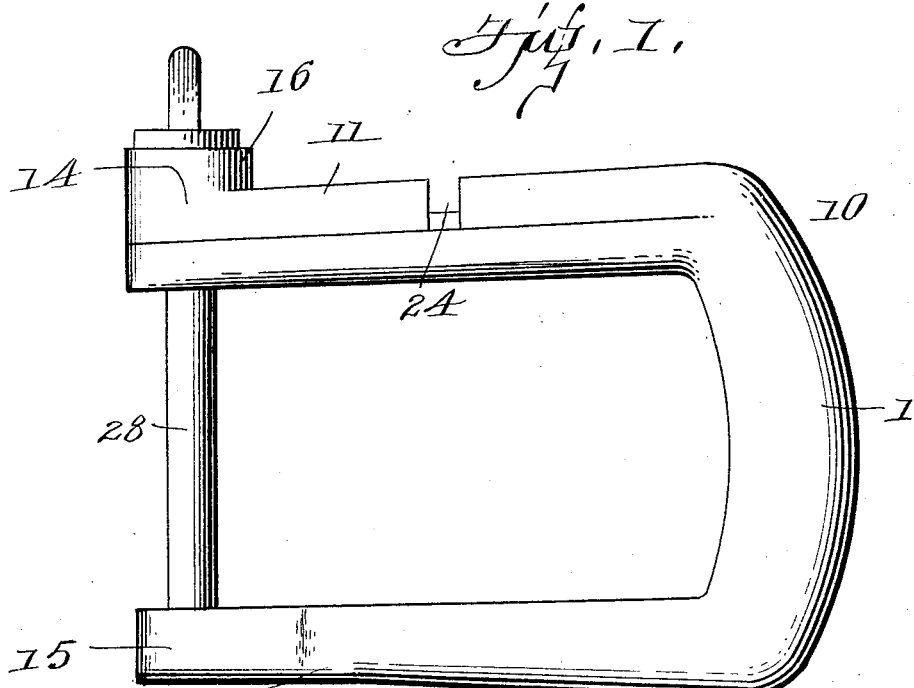
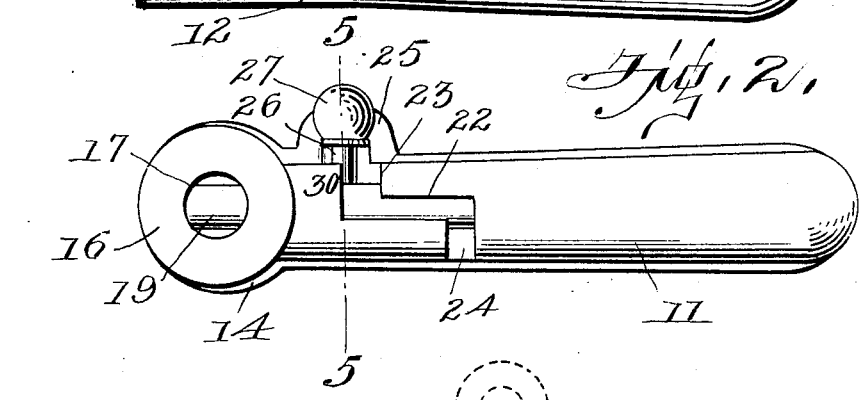
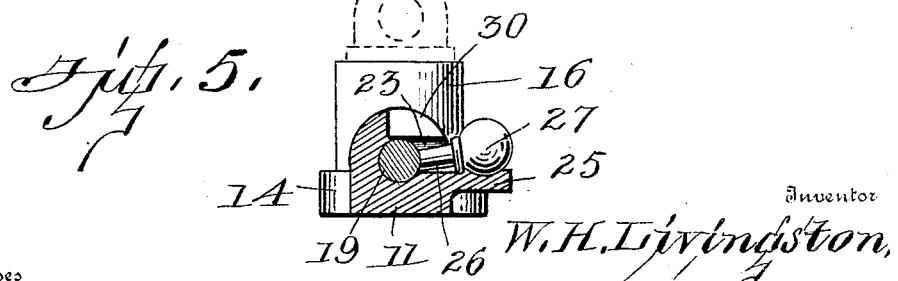
Witnesses
Jas. W. Noell
E. L. Chandlee
Inventor
W. H. Livingston,
By Woodward & Chandlee
Attorneys

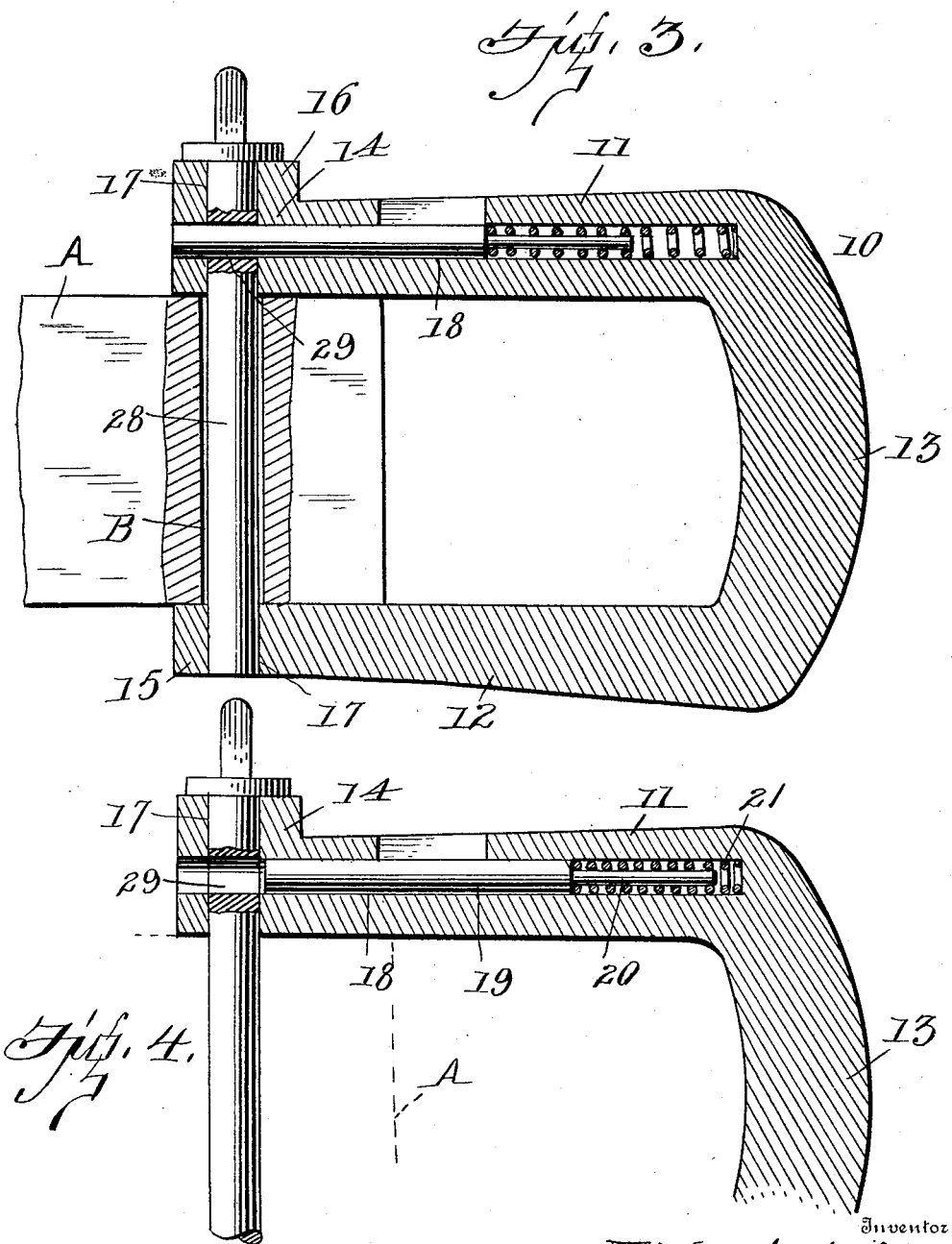

UNITED STATES PATENT OFFICE.

WILLIAM H. LIVINGSTON, OF ROSCOE, ILLINOIS.

CLEVIS.

No. 912,143.　　　Specification of Letters Patent.　　　Patented Feb. 9, 1909.

Application filed November 30, 1907. Serial No. 404,515.

*To all whom it may concern:*

Be it known that I, WILLIAM H. LIVINGSTON, a citizen of the United States, residing at Roscoe, in the county of Winnebago and State of Illinois, have invented certain new and useful Improvements in Clevises, of which the following is a specification.

This invention relates to draft appliances, and more particularly to clevises, and has for its object to provide a clevis of this character which may be cheaply manufactured and easily attached to an agricultural implement or the like, and which may be easily removed therefrom.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a side elevational view of the present clevis, Fig. 2 is a top plan view, Fig. 3 is a vertical longitudinal sectional view showing the clevis in a locked position upon the outer end of a plow beam, Fig. 4 is a similar view, the clevis being in an unlocked position, Fig. 5 is a cross sectional view on the line 5—5 of Fig. 2.

Referring now more particularly to the drawings, there is shown a clevis 10 which consists of the spaced arms 11 and 12 which are arranged in spaced relation, as shown. The arms 11 and 12 are thus arranged for engagement upon the outer end of a plow beam A as shown in Figs. 3 and 4 of the drawings. The arms 11 and 12 are connected by a forward bight portion 13, which is arranged to extend outwardly of the plow beam as shown. The inner ends of each arm 11 and 12 are laterally enlarged to provide heads 14 and 15, and the arm 11 is provided upon the head 15 with an upwardly extending boss 16.

The arms 11 and 12 are each provided with a vertically disposed passage 17 and these passages are formed at the rear ends of each of these arms as shown.

The arm 11 is hollowed out to provide a longitudinally extending bore 18, and this bore is formed by boring into the arm 11 from the rear end of the arm, as shown. The bore 18 is thus arranged to receive a slidable bolt 19, and this bolt is provided with a reduced portion 20 around which there is engaged one end of a coil spring 21. The other end of the coil spring is held within the bore as shown. The bolt 19 is thus arranged to extend normally across the passage 17 which is formed in the boss 16. The arm 11 is slotted upon its upper side as shown at 22, and this slot extends longitudinally of the arm, and is in communication at its rearward end with a lateral slot 23 which is formed upon one side of the arm 11, and the slot 22 is also in communication at its opposite end with a similar slot 24 which is formed at the opposite side of the arm 11 from the slot 23. The arm 11 is provided with an outwardly extending lip 25 and this lip is disposed beneath the slot 23, as shown. The bolt 19 is provided with an outwardly extending pin 26, and this pin is arranged for movement in the slots. The pin 26 is provided with a manipulating knob 27.

A vertically disposed pin 28 is arranged within the passages 17 which are formed in the arms 11 and 12, and this pin is thus arranged with a portion within a passage B which is formed in the plow beam A. The pin 28 is provided with a horizontally extending passage 29, and this passage is arranged to lie in line with the bore 18 which is formed in the arm 11. When the pin 26 is at the forward end of the slot 22 it will be seen that the bolt 19 is engaged with the passage 29 which is formed in the pin 28, and in order to hold the pin 26 from possible casual displacement the pin 26 is turned at right angles to bring this pin with a portion engaged in the slot 23, the knob 27 thus resting upon the lip 25. The rearward wall of the slot 23 is provided with an outwardly extending finger 30, and this finger is arranged to extend over the pin 26, when the pin is engaged within the slot 23 at the lower end thereof and against the lip 25. When it is desired to remove the clevis from the plow beam the bolt 19 is moved forwardly until the pin 26 is in line with the slot 24, after which the pin 26 is moved into the slot 24 to hold the bolt 19 out of engagement with the passage 29 which is formed in the pin 28. It will thus be seen that the pin 28 is now free from the bolt 19 and may be disengaged from the arms 11 and 12 and the plow beam A.

What is claimed is:

A clevis comprising spaced upper and lower arms, and a forward connecting bight, said arms having vertical alining passages formed therethrough at their rear ends, the upper arm having a longitudinal passage therewithin opening through its rearward end, a pin disposed in the vertical passages of the two arms, and having an opening therethrough registering with the longitudinal passage of the upper arm, said upper arm having a longitudinal slot formed therein and opening through its upper face, said slot communicating with the longitudinal passage of the upper arm, said upper arm having lateral oppositely extending slots communicating with the opposite ends of the first named slots, a lateral lip carried by the upper arm and extending horizontally beneath the lower end of the rearward lateral slot, a bolt slidably engaged within the longitudinal passage of the upper arm, a spring engaged between the forward end of the bolt and the forward end of the longitudinal passage, said spring being arranged to hold the bolt normally in position to extend through the opening of the pin, a second pin carried by the bolt and slidably engaged in the longitudinal slot of the upper arm, said pin being arranged to lie at times in the rearward lateral slot to hold the bolt against movement in one direction, and at times in the forward lateral slot to hold the bolt against movement in the opposite direction, a finger carried by the rearward wall of the rearward lateral slot and extending across a portion of the slot, and a manipulating arm carried by the outer end of the second pin and arranged for engagement of the laterally extending lip, said finger being arranged for engagement of the second pin therebeneath.

In testimony whereof I affix my signature, in presence of two witnesses.

WILLIAM H. LIVINGSTON.

Witnesses:
 OSAMUS C. YOUNG,
 KAY McCURRY.